Figure 1:
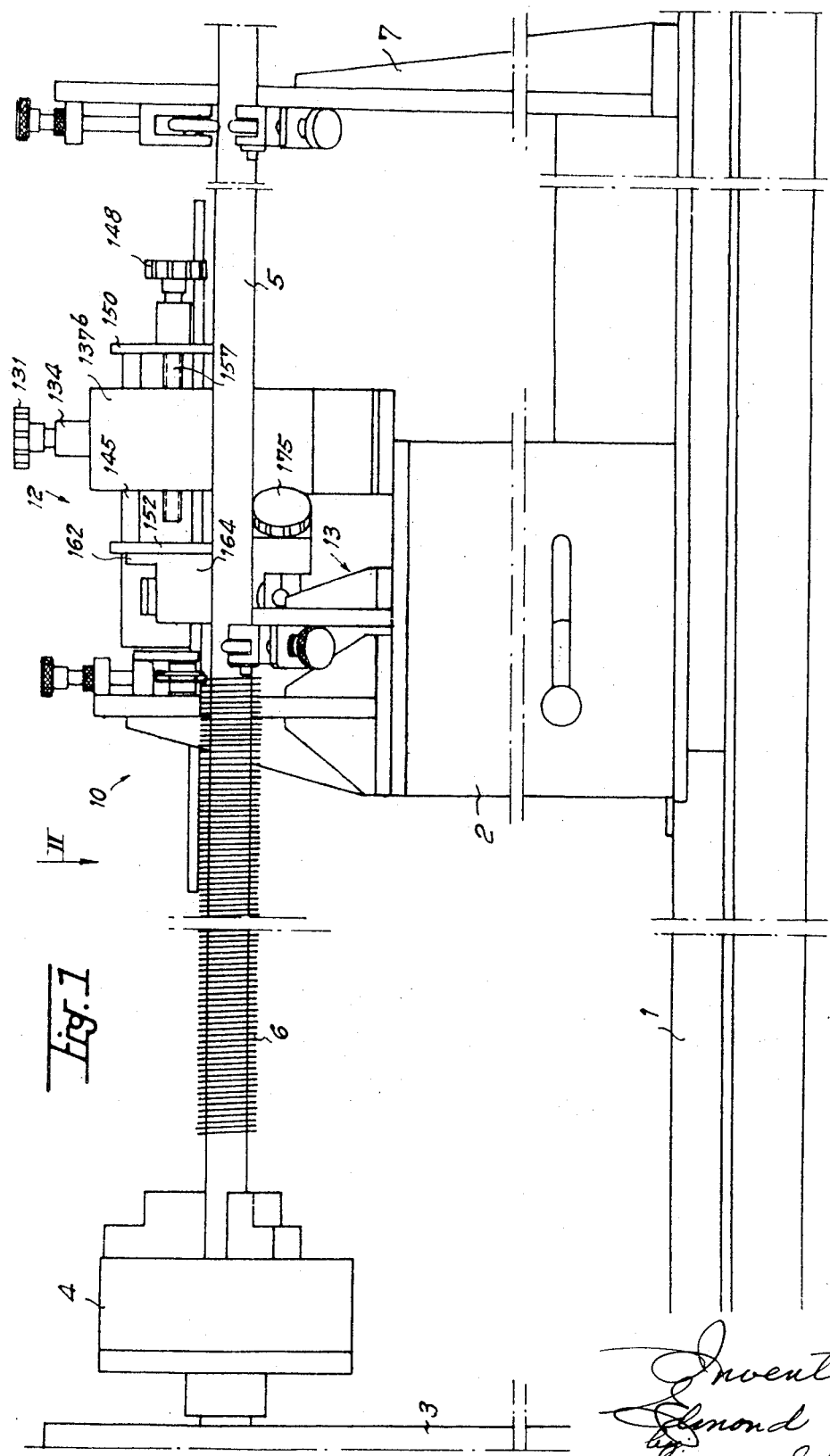

United States Patent
Pignal

[15] 3,662,942
[45] May 16, 1972

[54] APPARATUS FOR THE MANUFACTURE OF GILLED TUBES

[72] Inventor: Edmond Pignal, Thonon-les-Bains, France

[73] Assignee: Societe des Fabrications Biraghi-Entrepose, Paris, France

[22] Filed: Oct. 23, 1968

[21] Appl. No.: 769,824

[30] Foreign Application Priority Data

Oct. 23, 1967 France...................125455

[52] U.S. Cl..............................................228/25
[51] Int. Cl. ...........................................B23k 1/00, B23k 5/00
[58] Field of Search......................................228/25

[56] References Cited

UNITED STATES PATENTS

| | | |
|---|---|---|
| 2,036,732 | 4/1936 | Wall.........................................228/25 |
| 3,391,843 | 7/1968 | Bell..........................................228/25 |

Primary Examiner—John F. Campbell
Assistant Examiner—D. P. Rooney
Attorney—Edwin E. Greigg

[57] ABSTRACT

A machine for winding and welding a metal strip around a sealed exchanger tube to form a helical fin, using a welding electrode positioned in the angle between the strip and the tube surface. The tube is rotated while the strip is applied, the strip and electrode being supported on a longitudinally movable carriage. The support for the welding electrode is adjustable vertically, horizontally parallel to the axis of the tube, and also lengthwise along the axis of a sleeve pivotally attached to the support on a horizontal adjusting axis.

19 Claims, 20 Drawing Figures

Patented May 16, 1972

3,662,942

11 Sheets-Sheet 3

Patented May 16, 1972

3,662,942

11 Sheets-Sheet 4

Patented May 16, 1972

3,662,942

11 Sheets-Sheet 5

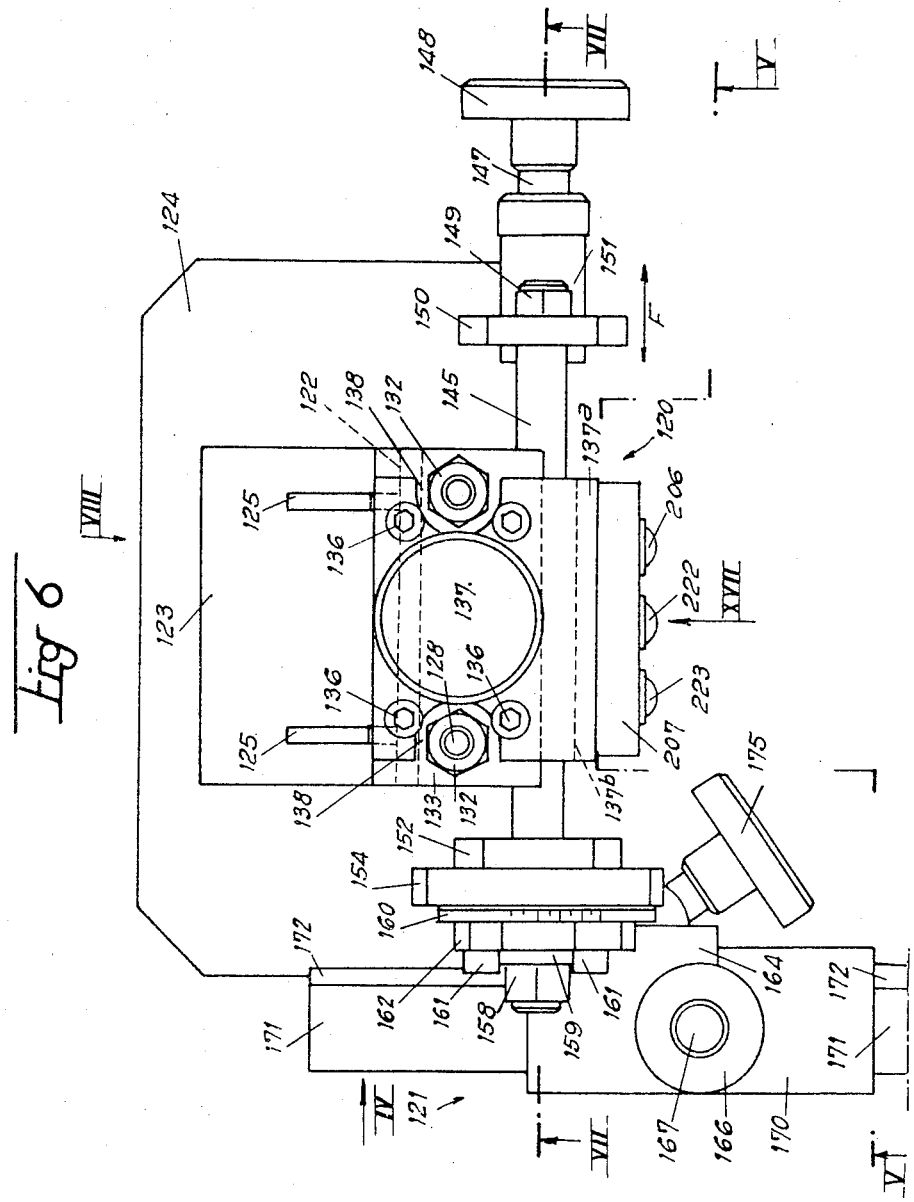

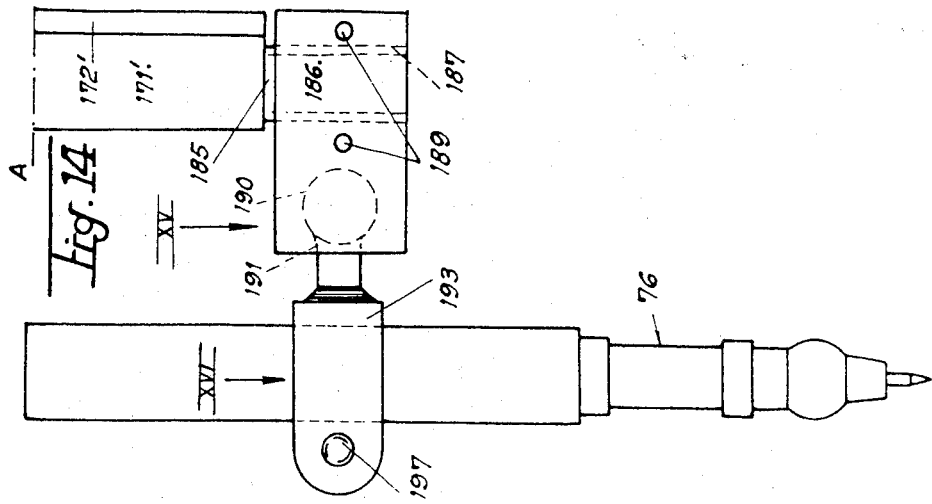
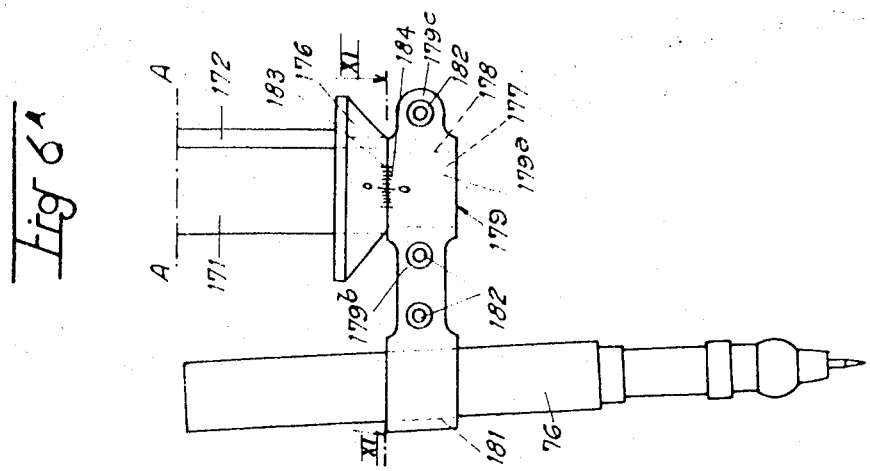

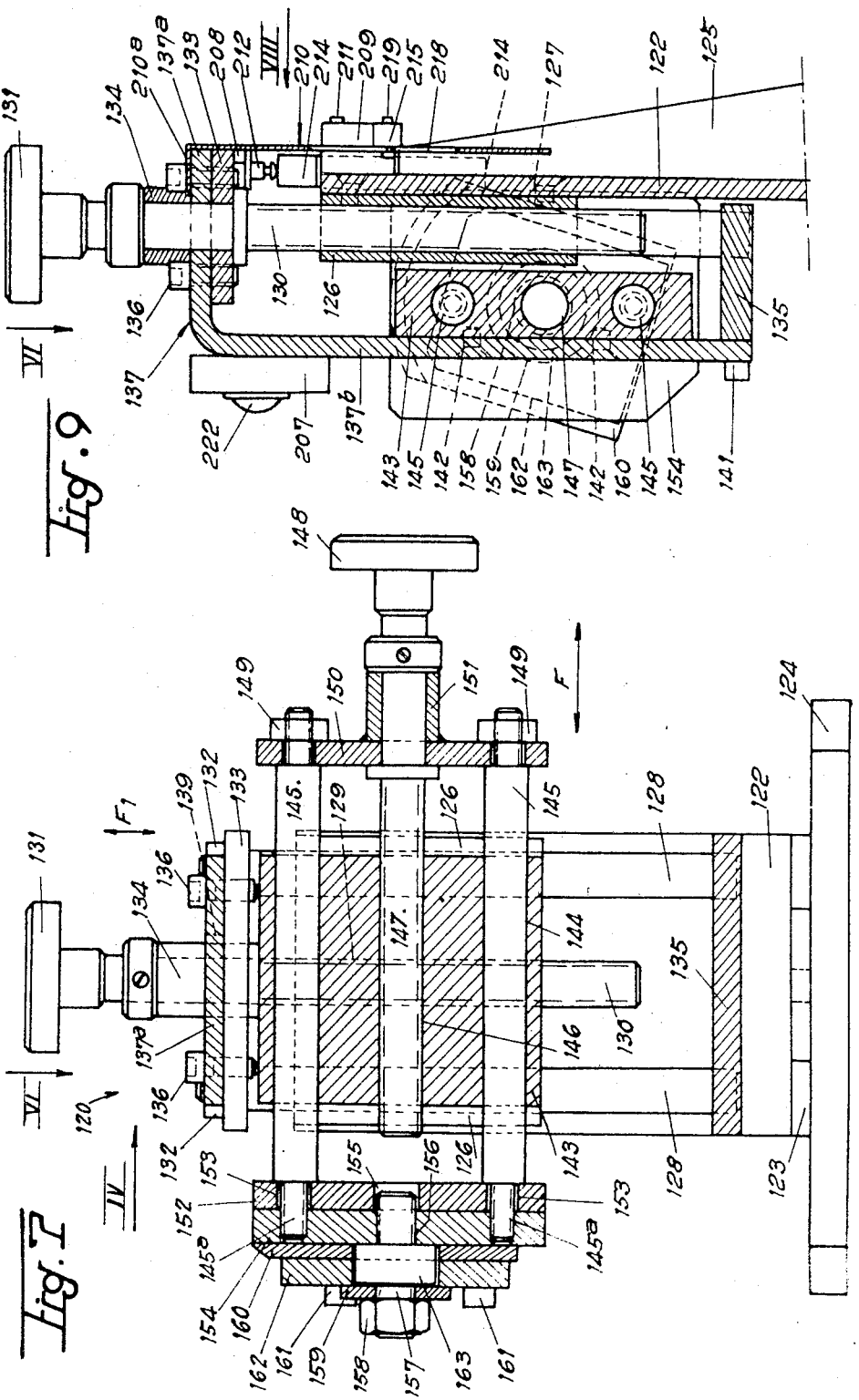

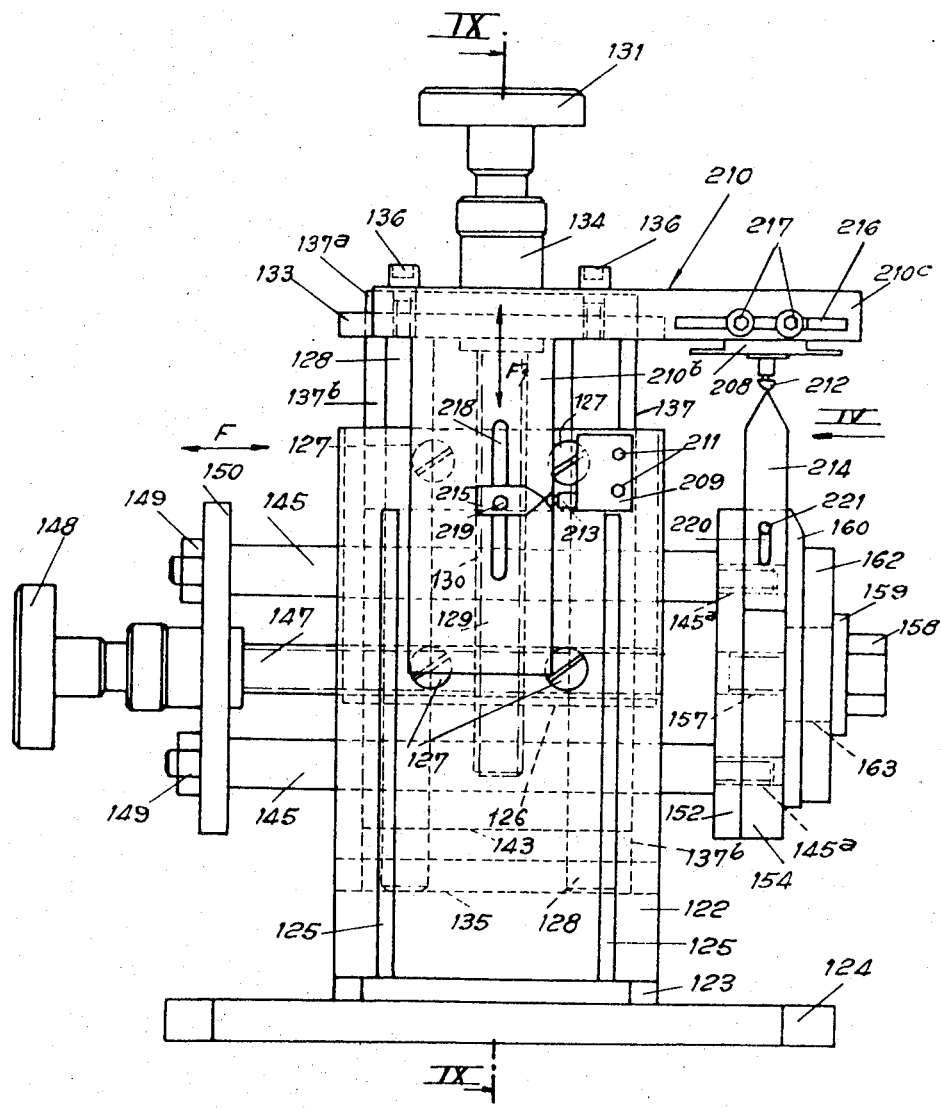

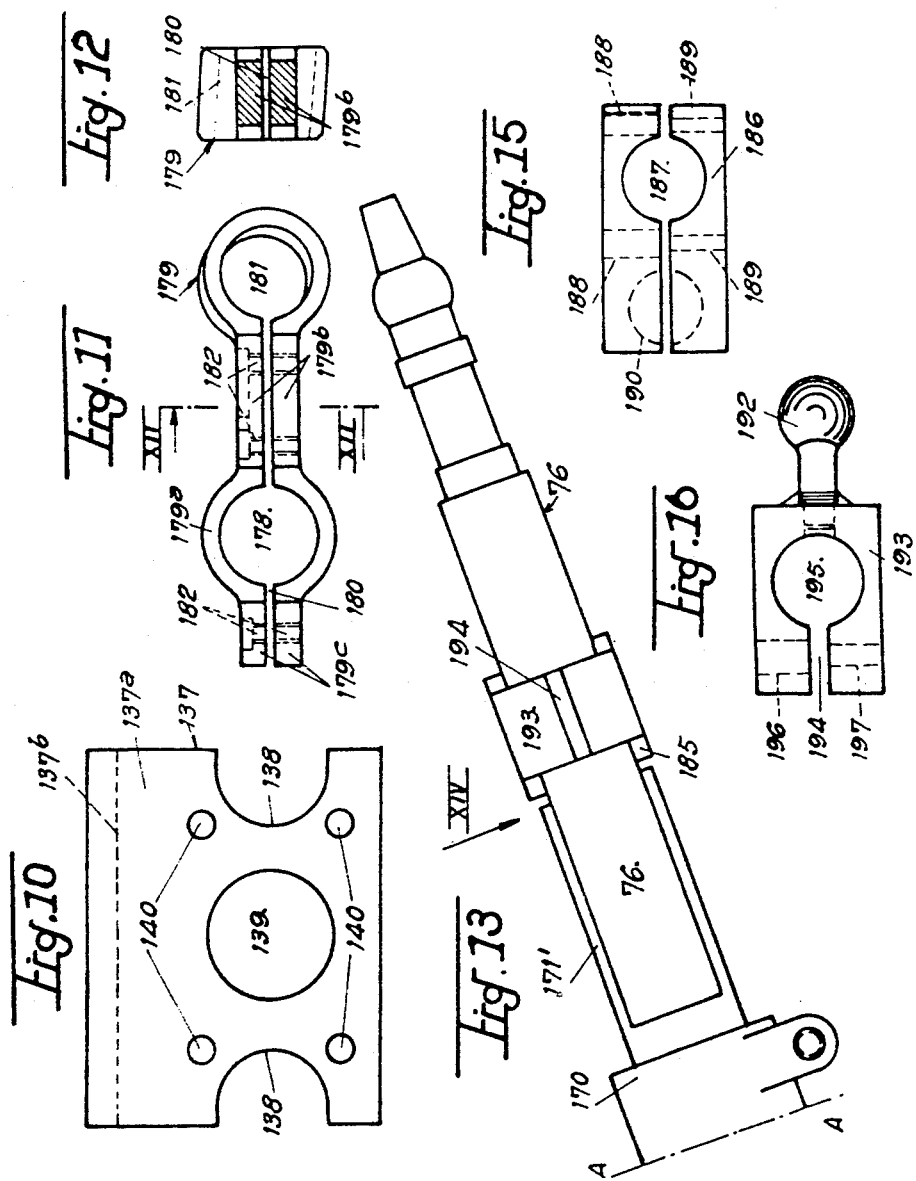

3,662,942

APPARATUS FOR THE MANUFACTURE OF GILLED TUBES

The invention relates to machines for manufacturing tubes having helical gills or fins, of the general type described in my U.S. Pat. No. 3,436,517 of Apr. 1, 1969, and in my copending U.S. Pat. application Ser. No. 769,823 filed Oct. 23, 1968, and now U.S. Pat. No. 3,557,427. Such a machine may comprise for example means for supporting the tube and for imparting to it a rotary movement about its axis, means for guiding and for applying around the tube the edge of a strip unwound from a spool, the angle of the strip to the axis of the tube being less than 90°, a support to hold a welding torch or electrode in the plane of the strip, in the angle which the edge of this latter forms with the tube, and means for displacing, parallel with the axis of the tube, the strip guide means and the torch or electrode support, the tube being connected to one pole of the welding current source, while the other pole is connected to the electrode or welding torch.

As hereafter used in this specification and claims the term "welding torch" is intended to be generic to any means for performing a welding operation, including, but not limited to, devices which heat the material directly, or devices which supply an electric current to the materials to be welded to thereby supply heat for welding.

The invention relates more particularly to the provision of a support for the welding torch which makes it possible accurately and reliably to regulate the position of this torch in relation to the tube and to the strip, and more precisely the distance of the torch from the tube, the orientation of the torch in relation to the axis of the tube, the angle of inclination of this torch in a vertical plane passing through the strip when this latter reaches the tube, the height of the torch in relation to the carriage of the machine which carries it, and the position of this torch on this carriage in a plane parallel with the axis of the tube.

From one aspect the invention consists in a support for a welding torch or electrode in a machine for producing tubes having helical gills or fins, comprising a fixed vertical platen mounted on the carriage of the machine, a block carried by said platen and in which a height-adjusting threaded rod and two smooth guide rods are capable of vertical displacement, an L-shaped member rigid with said rods, the vertical part of said member bearing a second block in which a horizontal adjustment threaded rod and two smooth guide rods are capable of displacement, all three being situated in a plane parallel with the axis of the tube, a sleeve carried by the horizontal guide assembly, and a tubular torch-carrying assembly mounted perpendicularly with respect to the axis of this sleeve so as to be able to rotate about this axis, and including means for causing rotation of said assembly, and rack-and-pinion means for causing forward feed in this assembly of a collar assembly in which it is possible to secure the torch proper.

The connection between the vertical guide rods and the L-shaped member advantageously comprises a horizontal plate into which are screwed the lower ends of the aforesaid rods and to which the lower end of the vertical part of the L-shaped plate is bolted.

The horizontal adjustment rods are preferably screwed at one end into a plate bearing a threaded rod on which is keyed a pivot for the connecting piece to which is secured the sleeve bearing the tubular torch-carrying assembly.

In one embodiment, the collar assembly comprises two jaws whose spacing is adjustable by screw means, and a part of the sleeve forms a cylindrical bore to receive the end of a tube which is movable by reason of the said rack-and-pinion means. The said collar comprises either a cylindrical bore to receive the torch or a cylindrical cavity to receive a ball integral with a torch carrier and also receiving the torch between two adjustable cylindrical jaws.

A support according to the invention may also comprise safety devices operating by electrical contactors which automatically signal any incorrect position of the torch either in the vertical direction or in the horizontal direction or in the longitudinal direction of the torch itself.

In one embodiment of the invention a contactor adapted to detect an incorrect position of the torch in the longitudinal direction thereof is carried by the aforesaid sleeve and is provided with a spring-loaded control rod which co-operates with an abutment integral with a tube carrying the collar assembly.

Another contactor adapted to detect an incorrect position of the torch in the horizontal direction is carried by an L-shaped support from the horizontal part of the L-shaped plate, has a spring-loaded control rod integral with the horizontal adjustment rods, and is adjustable in position by means of a horizontal elongated aperture provided in an appropriate path of its L-shaped support and having two bolts, while the abutment is adjustable in height by means of a vertical elongated hole co-operating with a bolt carried by the plate.

A third contactor adapted to detect an incorrect position of the torch in the vertical direction is carried by the vertical platen and has a spring-loaded control rod co-operating with an abutment carried by an appropriate part of the support which connects to the L-shaped plate the contactor which is adapted to detect an incorrect position of the torch in the horizontal direction, and the abutment is adjustable in position by means of an elongated aperture in the aforesaid support and by a bolt. Each of the aforesaid contactors is incorporated in an electric circuit between a current source and a warning light carried by the vertical platen of the support. Preferably, the aforesaid circuits connecting the safety contactors to the current source and to the warning lights comprise contacts incorporated into a circuit which supplies the welding torch with current, so as to break this circuit if at least one of the contactors is functioning, that is to say if the torch is occupying an incorrect position.

Preferably the aforesaid circuits comprise contacts which are similarly interposed in the general circuit which controls the machine, that is to say the circuit which allows on the one hand rotation about its axis of the tube on which a strip is to be wound and on the other displacement of the torch carriage parallel with the axis of this tube.

Figure 2:
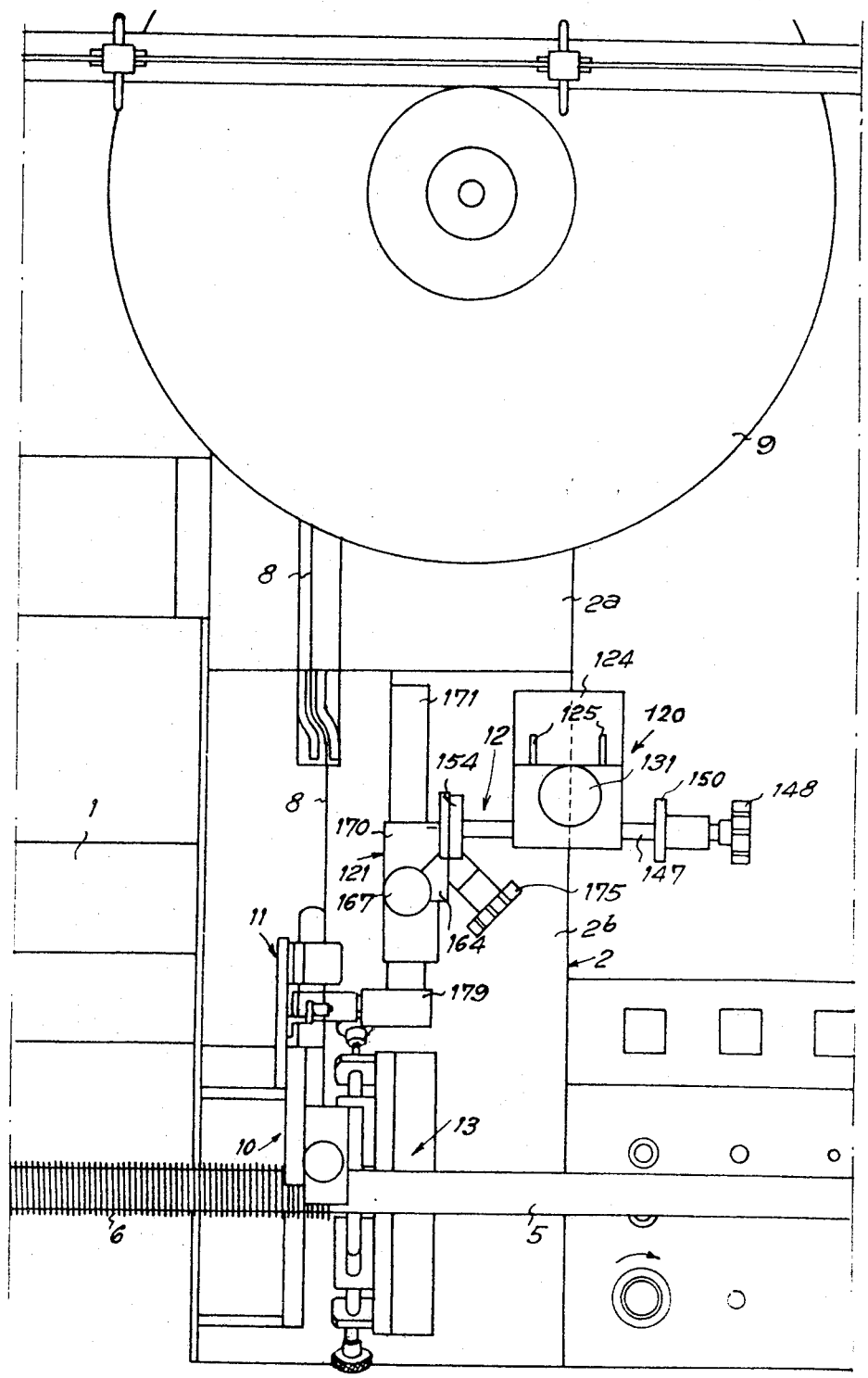
Figure 3:
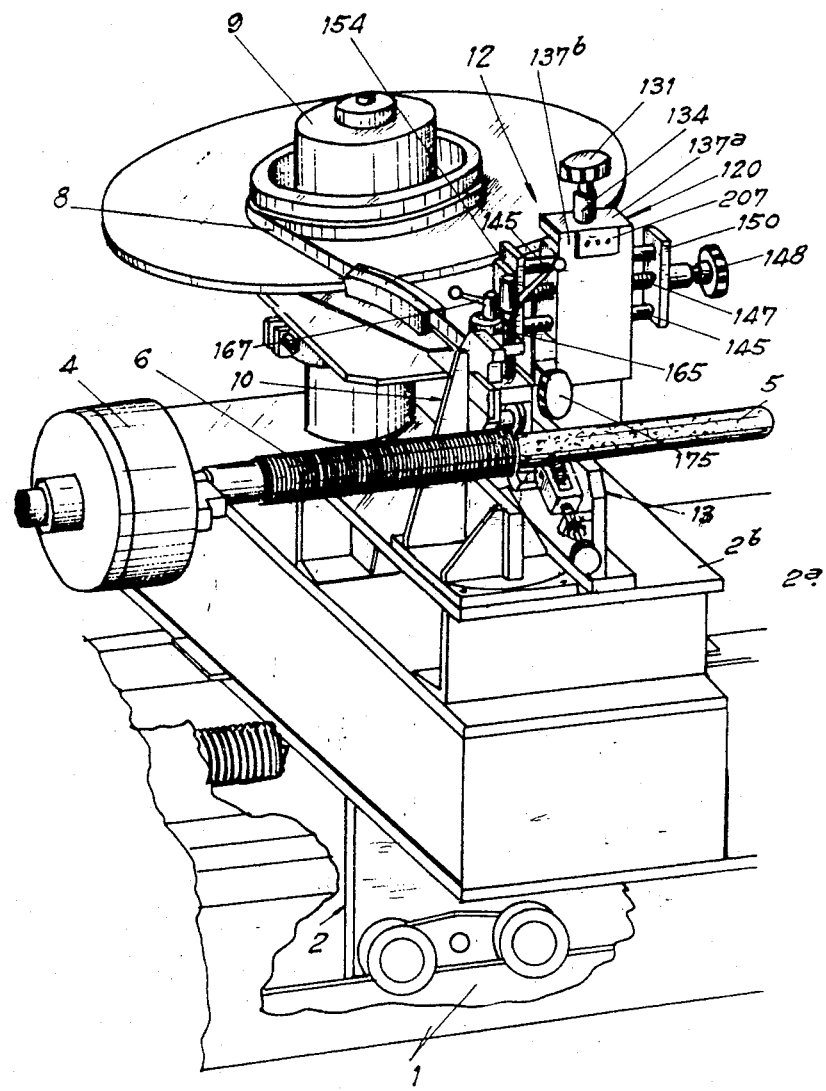
Figure 4:
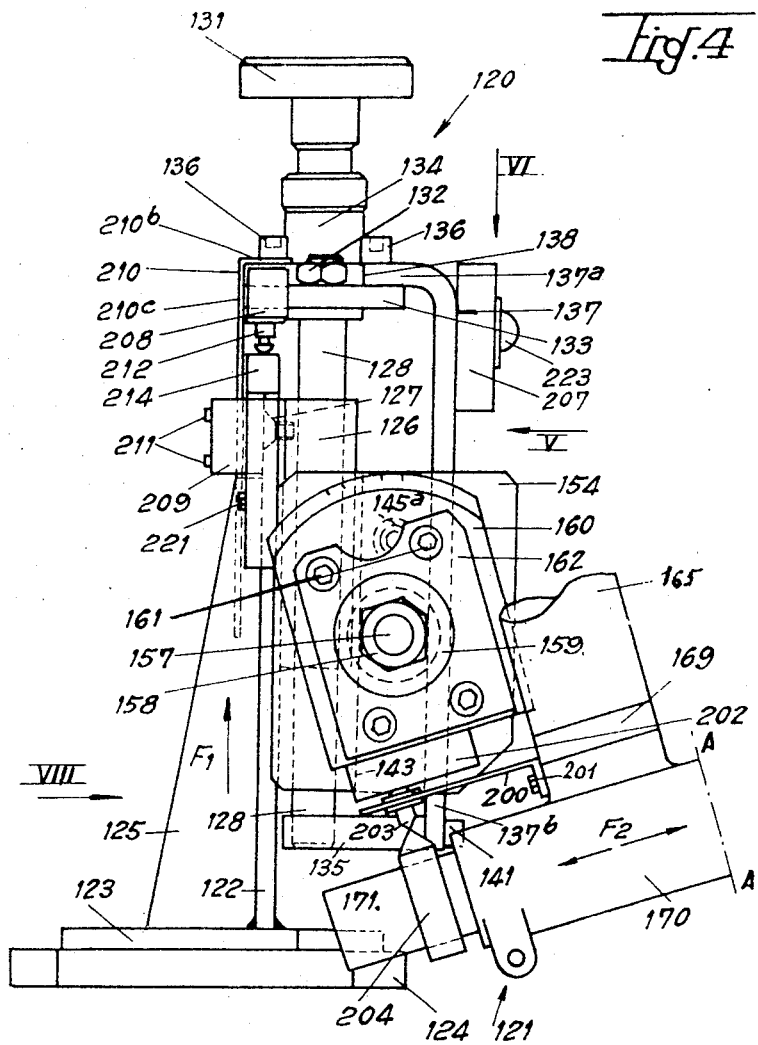
Figure 4A:
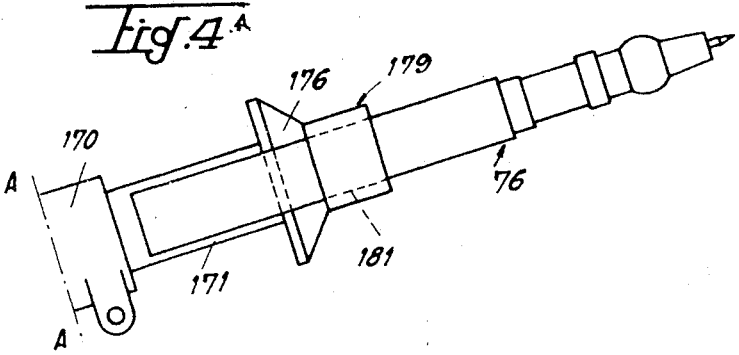
Figure 17:
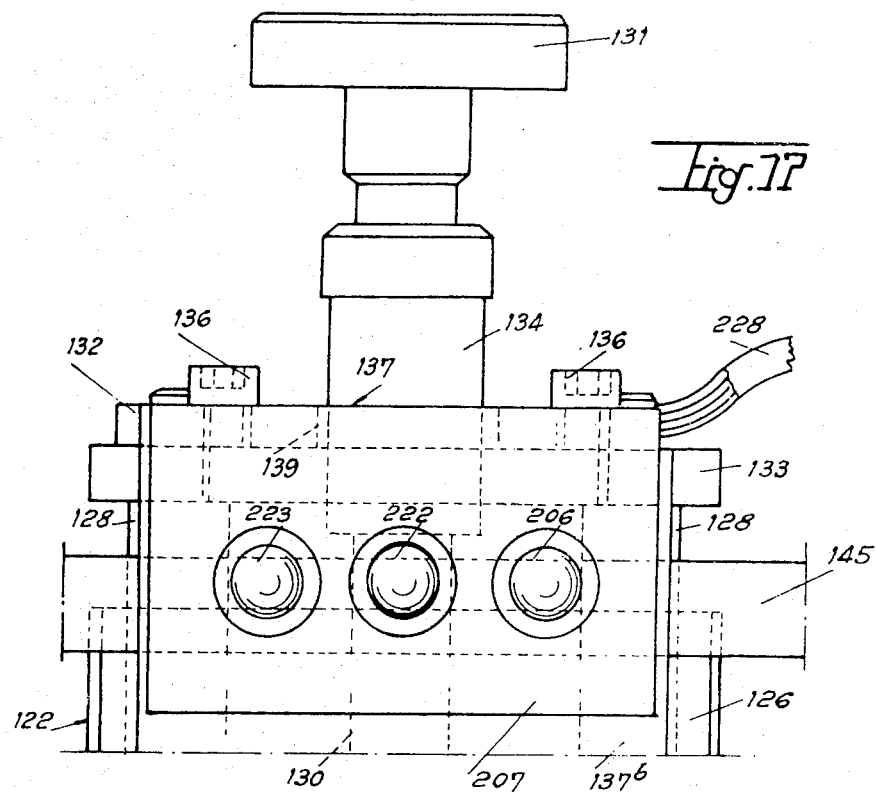
Figure 18:
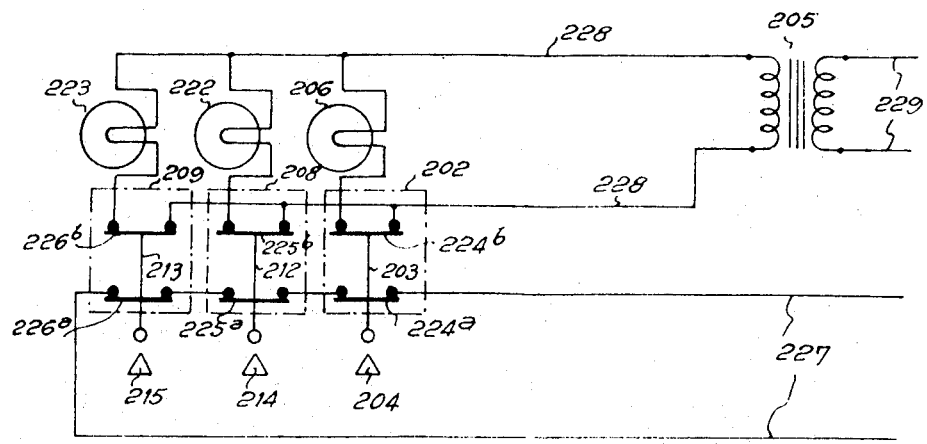

The invention may be performed in various ways and a number of embodiments will now be described by way of example with reference to the accompanying drawings, some of which are intended to be linked together along the lines A—A, and in which:

FIG. 1 is an elevation, FIG. 2 a plan and FIG. 3 a perspective view of the assembly of a machine to which the invention is applied, FIGS. 4 and 4a are jointly an elevation of the torch support in the direction of the arrows IV in FIGS. 5 to 8, FIG. 5 is an elevation in the direction of the arrows V of FIGS. 4, 8 and 9 on the plane V—V of FIG. 6, FIGS. 6 and 6a are jointly a plan of the torch support in the direction of the arrow VI in FIGS. 4, 5 and 7 to 9, FIG. 7 is a cross-section through FIG. 6, along the line VII—VII, FIG. 8 is an elevation in the direction of the arrow VIII in FIGS. 7 and 9, FIG. 9 is a cross-section through FIG. 8 along the line IX—IX, FIG. 10 is a plan view of an element of the torch-carrying assembly, FIG. 11 is an elevation of the torch-carrier proper taken along the line XI—XI of FIG. 6a, FIG. 12 is a cross-section through FIG. 10, along the line XII—XII, FIG. 13 is an elevation, similar to FIG. 4a, through an alternative torch support arm, FIG. 14 is a plan similar to that of FIG. 6a, in the direction of the arrow XIV of FIG. 13, of an alternative embodiment of torch support, FIGS. 15 and 16 are elevations, respectively in the direction of arrows XV and XVI of FIG. 14, of a connector and of the torch carrier proper, which constitute part of this embodiment, FIG. 17 is a partial elevation in the direction of the arrow XVII of FIG. 6, showing the disposition of the panel carrying the warning lights of the device which gives warning of accidental displacements of the torch carrier, and FIG. 18 is a diagram showing the electrical connections of the contactors and warning lamps of the regulating system for the three dimensions of the torch-carrying means.

Considering initially FIGS. 1 to 3, it will be seen that the machine, of the general type described in the aforesaid patent application, comprises a base 1 along which a frame or carriage 2 provided with wheels can be displaced on appropriate rails under the action of a lead screw (FIG. 3) in the manner of a lathe carriage. At one end of the base is mounted a casing 3 containing a rotational drive mechanism for a chuck 4 which serves to support one of the ends of a tube 5 which is to be provided with a helical gill or fin 6. The other end of the tube, as well as various points along the length thereof, are supported by supports or similar means of which one only is illustrated at 7.

The carriage 2 supports tables 2a, 2b, at different levels. Table 2a carries a guide system for the strip 8 from which the gill or fin 6 is made, and which unrolls from a spool 9, and table 2b carries the support for the welding torch which is the object of the invention. In FIGS. 1 to 3, the pressure roller carrying assembly is illustrated generally by the reference numeral 10. The assembly of guide rollers which serve to carry the strip into the desired position in relation to the tube is illustrated by 11 and the welding torch assembly according to the invention is represented by 12. In these figures, reference numeral 13 also denotes a means for supporting the tube 5 mounted on the frame 2 in the vicinity of the assembly 11, and which may be of a type similar to that of the supports 7.

Referring to FIGS. 4 to 18, the torch carrier or welding head assembly 12 in FIGS. 1 to 3 will now be described.

It will be seen from these drawings that the assembly 12 is adapted to allow uniform adjustment of the welding torch or electrode, that is to say an adjustment in height, horizontally in the longitudinal direction in relation to the tube, horizontally in the direction perpendicular to the axis of the tube and finally, as an accessory feature, in a vertical plane which is oblique to the axis of the tube.

For this purpose, the welding head essentially comprises a vertical frame designated generally by 120 (FIGS. 4–10) and a torch-carrying assembly 121. The frame 120 comprises a vertical platen 122 welded to a base plate 123 by which it is secured to a base 124 which is itself secured to the table 2b of the carriage 2. Two vertical ribs 125 reinforce the platen 122 which is parallel with the tube 5 and carries a parallelepiped block 126 (FIGS. 4 and 7) fixed to the platen 122 by screws 127 and provided with two smooth holes for passage of two smooth vertical guide rods 128 and with a screw-threaded hole 129 for passage of a threaded drive rod 130, the top end of which ends in a knurled knob 131. The top threaded ends of the rods 128 are secured by nuts 132 to a horizontal plate 133 in which is welded a sleeve 134 integral with the rod 130, and the bottom threaded ends of the rods 128 screw into a horizontal plate 135 which is bolted at 136 to a plate 137 of L-shape cross-section (FIGS. 4 to 10) comprising an upper horizontal leg 137a and a vertical leg 137b. The leg 137a has (FIGS. 6 and 10), at the ends of its long sides, two semi-circular cut-outs 138, in its center a large smooth circular hole 139, and four circular holes 140 of smaller diameter which accommodate the bolts 136. The plate 135 is moreover secured by screws 141 into the bottom part of the leg 137b.

The plate leg 137b is moreover provided with holes for passage of bolts 142, adapted to secure a block 143 provided with two smooth bores 144 for passage of two horizontal smooth rods 145, and with a screw-threaded bore 146 for passage of a threaded rod 147 provided at one end with a knurled knob 148. The ends of the rods 145 are threaded. At one of these ends, they are fixed by nuts 149 to a vertical bar 150 provided with a welded sleeve 151 integral with the rod 157. Towards their other end, they pass freely through a vertical bar 152, through apertures 153, and at 145a, they are screwed into a plate 154 to which the torch-carrying assembly 121 is secured in a manner to be described hereinafter.

It is clear from the foregoing description that the knob 148 allows displacement of the plate 154 horizontally according to a double arrow F in FIGS. 5 to 8, whereas the knob 131 makes it possible to displace the plates 133 and 137, also the block 143 and therefore the plate 154, vertically according to the double arrow F1 in FIGS. 5 to 8.

Figure 5:
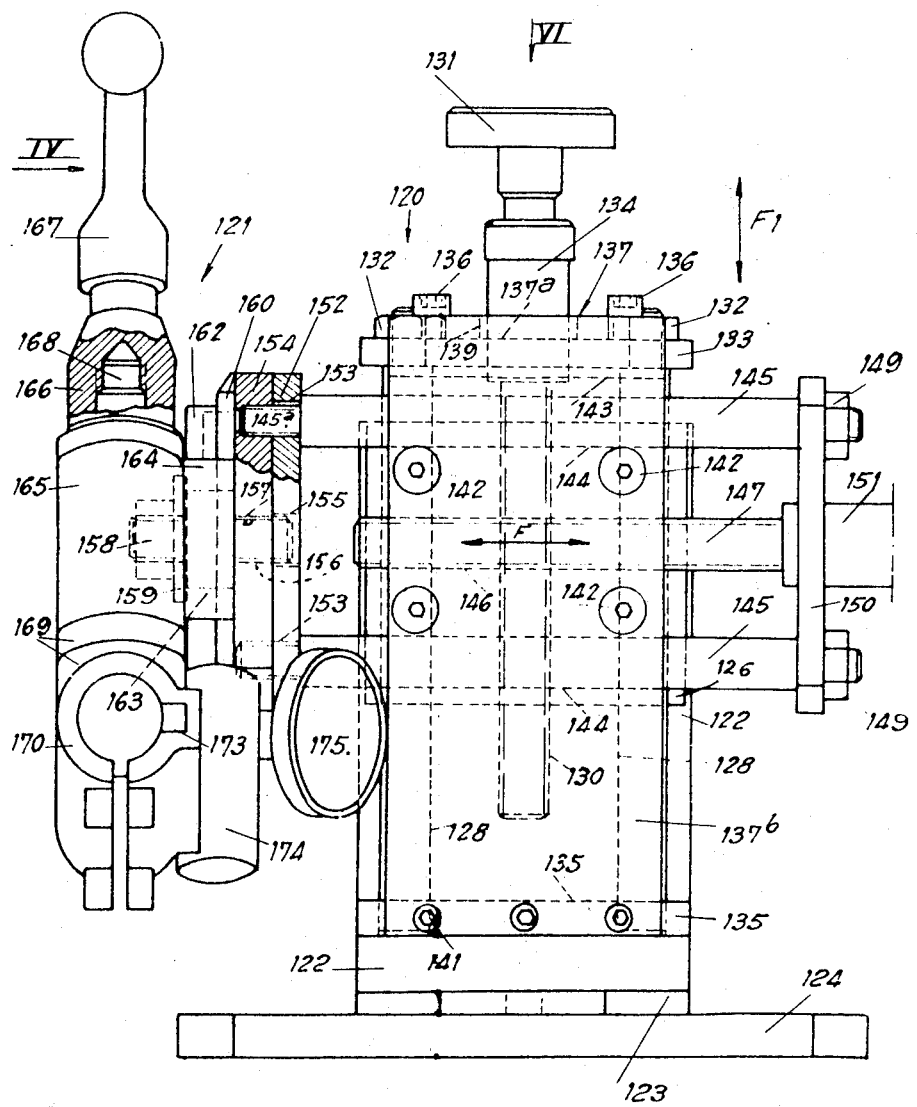

The plate 152 is provided with a smooth hole 155 (FIG. 5), and the bar 154 with a threaded hole 156, to receive the end of the threaded rod 157 fitted with a nut 158 and a locking washer 159. A graduated plate 160 is secured by screw 161 (FIGS. 4, 6) to a support 162 adapted to rotate about a pivot 163 carried by the rod 157. One side of the support 162 is extended partially by a connecting member 164 to which is secured a sleeve 165 (FIG. 5). Mounted in this sleeve in a manner so that it can pivot through a limited angle about its axis is a member 166 which bears at its upper end a control knob 167 and at its bottom end, secured by a threaded rod 168 which screws into a threaded bore in the member 166, a cylindrical sleeve 169, the free end of which carries a perpendicular tube 170.

The tube 170 serves as a slideway for a sliding torch holder shown in FIGS. 4 to 6. This slide comprises a tube 171 mounted on a side of a rack 172 which engages in a corresponding recess 173 (FIG. 5) in the tube 170. This rack meshes in known manner with a pinion accommodated in a casing 174 and operated by a knurled knob 175 (FIGS. 1 to 3 and 5).

The forward end of the tube 171 is fixed to the interior of a frustoconical member 176 (FIGS. 4A and 6A) and ends in a cylindrical socket 177 adapted to rotate in a bore 178 in a collar generally designated 179 (FIG. 11). The bore is formed by two half rings 179a separated by a gap 180. The collar 179 comprises a second bore 181 in which the slot 180 ends diametrically. The collar 179 thus has a certain elasticity which facilitates fitment of the socket 177 into the bore 178 and that of the torch 76 into the bore 181. The collar is clamped onto these members by screws (not shown) which screw into screw-threaded holes 182 provided in the member 179b, 179c of the collar. Graduations 183, 184 traced respectively on the member 176 and on the top half-collar 179a, make it possible to adjust the angle of inclination of the collar 179 in relation to the tube 171. As shown in FIG. 11, the axes of the bores 178 and 181 are not parallel, so that the torch 76 is not parallel with the tube 171 (FIG. 6A). This arrangement is preferable, because it makes it possible to give the torch the same angle of inclination in respect of the axis of the tube 5 which is to be fitted with the gills or fins, as the angle between the strip 8 and the axis of the tube 5; this angle determines the pitch of the spiral gills 6 on the tube.

In the alternative embodiment shown in FIGS. 13 to 16, a socket 185 of the tube 171' (FIG. 13) is clamped in a fitting (FIGS. 13 to 15) formed by two symmetrical halves 186 having on their facing surfaces two semi-cylindrical hollows 187 in which the socket 185 can fit. Aligned screw-threaded holes 188, 189 traversing the two halves of the fitting, make it possible to assemble this latter by means of screws. Finally, each half 186 of the fitting is provided with a hemispherical cavity 190 connected by a semi-cylindrical passage 191 to the end of the fitting opposite that in which are located the hollows 187. In the sphere thus formed, it is possible to accommodate a ball 192 (FIG. 16) rigid with the torch carrier proper 193 in which the electrode 76 may be clamped. For this purpose, the torch carrier 193 is split at 194, is formed with a cylindrical recess 195, and has two screw-threaded holes 196 and 197 in alignment, into which a locking screw may be screwed.

Whichever form of welding head is selected, it will be appreciated that the electrode 76 may be fed forwardly or withdrawn in relation to the tube 171 (or 171') in the direction of the double-headed arrow F2 in FIG. 4 by manipulating the knob 175. The knobs 131, 148 and 175 therefore make it possible to adjust the position of the electrode 76 in all three directions in space, and the handle 167 makes it possible slightly to vary the angle of the electrode in relation to the axis of the tube, on either side of a plane strictly perpendicular to this axis.

Once the welding torch has been fixed in the correct position, it is desirable to be assured that it will remain there, or at least that any involuntary displacement may be immediately corrected. For this purpose, according to the invention, three systems of safety contacts are provided, each of which illuminates a warning lamp, making it possible at any moment to check whether there is a need to make a correction and, if so, which. This system is shown in FIGS. 4, 6, 8, 9, 17 and 18.

FIG. 4 shows a system of contacts which functions in the event of a disturbance of the longitudinal position of the electrode in relation to the torch carrier 121. A bracket 200 (FIG. 4, lower center) secured at 201 to the sleeve 165 bears a contactor 202 from which projects a spring-loaded control rod 203. On the tube 171 is an abutment 204, the top end of which co-operates with the bottom end of the rod 203. The contactor 202 is connected on the one hand to a current source 205 (FIG. 18) and on the other hand to a warning light 206 and mounted on a panel 207 (FIG. 17) fixed advantageously by any means (not shown) to the platen 122.

Two contactors 208, 209 of the same type as the contactor 202 can be seen in FIGS. 4, 8 and 9. The contactor 208 (FIG. 8, upper right) is fixed in a manner which will be described hereinafter to a plate 210 of L-shaped cross-section, shown in FIGS. 4, 8 and 9, and of which the horizontal flange 210a is secured to the plate 137a and to the plate 133 by two of the screws 136 (FIG. 9). The contactor 209 is fixed by screws 211 (FIG. 9, right center) to the platen 122. The contactors 208, 209 are provided with spring-loaded control rods 212, 213 which co-operate respectively with abutments 214, 215 carried respectively by the plate 154 and by the main part 201b of the vertical flange of the plate 210. The contactor 208 and the abutments 214, 215 are adjustable in position: for this purpose, a secondary part 210c (FIG. 4, upper left) of the vertical flange of the plate 210 extends horizontally to a position above the plates 152, 154 and 260 and is provided with a horizontal elongated aperture 216, (FIG. 8) in which two pin-members 217 are capable of sliding and of being locked by being screwed into the wall of the contactor 208, so as to immobilize this contactor with the control rod 212 in vertical alignment with the abutment 214 and the plate 154. Likewise, an elongated aperture 218 in the face 210b of the plate 210 is traversed by a pin-member 219 (FIGS. 8 and 9) which makes it possible to immobilize the abutment 215 in horizontal alignment with the rod 213. Finally, an elongated aperture 220 of the abutment 214, which is traversed by a pin-member 221, makes it possible to lock the abutment 214 so that it is in contact with the rod 212, by screwing the pin-member 221 fully home into a screw-threaded hole in the plate 154 (FIG. 8).

It will be clear from the foregoing description that the spring-loaded rod 212 ceases to be in contact with the abutment 214 if the assembly 145, 147, 154 is displaced horizontally under the influence of the knob 148, or accidentally (the adjustment being made for the optimum position of the torch). This horizontal displacement however does not affect the contact between the rod 213 and the abutment 215 so long as the height setting of the torch is satisfactory. Similarly, if the knob 131 is manipulated or if the height of the torch is accidentally varied, the contact between the rod 215 and the abutment 213 is broken without breaking the contact between the rod 212 and the abutment 214, if the horizontal adjustment of the torch is satisfactory. The contactors 208, 209 are connected to the current source 205 and to warning lights 222, 223 which are respectively marked "Horizontal" and "Vertical" and which are likewise mounted on the panel 207.

Each contactor 202, 208 and 209 (FIG. 18) comprises pairs of contacts 224 to 226, each comprising two contacts 224a and 224b, and 225a and 225b, 226a and 226b carried respectively by rods 203, 212, and 213, and which open and close simultaneously every time the corresponding control rod is displaced. The contacts 224a, 225a and 226a are mounted in series in the circuit 227 of the welding relay so as to break this circuit if one of the contacts is opened. The contacts 224b, 225b, 226b are mounted in series in a circuit 228 which connects them to the source 205 through warning lamps 206, 222 and 223. The circuit of the welding relay monitors transmission of current to the welding electrode 76. The contacts 224 to 226 are normally kept closed by the engagement of rods 203, 212 and 213 with the abutments 204, 214 and 215. Therefore, if the position of the torch 76 is accidentally altered during the course of welding, the corresponding contact 224, 225 or 226 is opened and the circuit 227 is broken, which stops the motor until the electrode 76 is restored to the correct position. The circuit 227 may moreover, at the same time, break the circuit operating the motors which cause rotation of the tube 5, displacement of the carriage 2 and passage of the strip 8, so that the machine automatically stops if the welding torch is not in the desired position. Moreover, under conditions of normal operation, the lamps 206, 222 and 223 are illuminated by closure of the contacts 224b to 226b. In the case of an accident which is reflected in the opening of one of these contacts, the corresponding lamp is extinguished. The machine supervisor can therefore immediately establish the origin of the fault and make the corresponding adjustment.

The source 205 may be of any type but is advantageously constituted by the low voltage (24 volts) secondary side of a transformer, the primary side of which is connected to the general mains supply 229 feeding the welding plant.

I claim:
1. An adjustable mounting for a welding torch, to perform welding on a work piece, comprising in combination,
   A. a support structure including
      1. a machine frame and
      2. a carriage mounted for horizontal movement,
   B. means mounted on said machine frame for holding a work piece and rotating it about a first, horizontal axis oriented parallel with the direction of said horizontal movement of said carriage,
   C. means mounted on said carriage for holding a welding torch adjacent the peripheral surface of said work piece and comprising means for adjusting the position of said welding torch along a line perpendicular to said first axis, the last-named means including
      1. a vertical platen fixed on said carriage,
      2. a first block fixed to said platen,
      3. two smooth vertical guide rods mounted within said first block for sliding movement,
      4. a vertical rod threaded through said first block and
      5. an L-shaped member having a horizontal flange to which said smooth vertical rods are fixed and within which said threaded vertical rod is rotatably mounted and
   D. means for moving said welding torch along a line generally parallel to said first axis.

2. The combination of claim 1 including a second block mounted on a vertical flange of said L-shaped member, two smooth guide rods mounted in said second block for horizontal movement, a third horizontal rod threaded through said second block, a sleeve having a second axis fixed to said horizontal smooth rods and to said horizontal threaded rod to be horizontally adjusted thereby in response to rotation of said threaded rod, a tubular torch-carrying assembly mounted perpendicularly with respect to said second axis for rotation about said second axis, means for rotating said tubular assembly with respect to said second axis and rack-and-pinion means for causing forward feed within said tube of a collar assembly for securing said welding torch.

3. A support according to claim 2, in which the connection between the vertical guide rods and the L-shaped member comprises a horizontal plate in which are screwed the lower ends of the rods and to which is bolted the lower end of the vertical part of the L-shaped member.

4. A support according to claim 2, in which the horizontal adjustment rods are screwed at one end into the plate which carries a threaded rod on which is keyed a pivot for a connecting member to which is secured the sleeve bearing the tubular torch-carrying assembly.

5. A support according to claim 2, in which the collar assembly comprises two jaws, and screw adjusting means for varying the spacing between said jaws, and a part of this sleeve at least forms a cylindrical bore to accommodate the end of a tube which is movable by means of said rack-and-pinion means.

6. A support according to claim 5, in which the collar comprises a second cylindrical bore to accommodate the torch.

7. A support according to claim 5, in which the collar comprises a cylindrical cavity to accommodate a ball rigid with a torch carrier which also accommodates the torch between two cylindrical jaws of screw-regulated spacing.

8. The combination of claim 1, wherein said means for adjusting the position of said welding torch along a line perpendicular to said horizontal axis includes a second block secured on said L-shaped member, two smooth guide rods mounted for horizontal movement in said second block, a third horizontal rod which is threaded through said second block, and means connecting said welding torch to said smooth and threaded horizontal rods, whereby it is horizontally adjusted by rotation of said third threaded rod.

9. The combination of claim 1 including electrical means for detecting an incorrect position of the welding torch in the vertical direction including an electrical contact carried by each of said vertical platens and a vertical flange on said L-shaped member, one of said electrical contacts being fixed on its support member and the other of said electrical contacts being mounted in a vertically elongated aperture in its support member, pin means for holding said other electrical contact member in any desired vertical position within said elongated aperture to thereby serve as an indication of a correct desired position of said welding torch, spring means for biasing one of said electrical contacts towards the other, electric current supply means connected to each of said electrical contacts, and signal light means for producing a signal in a desired position of said electrical contacts.

10. The combination of claim 8 including electrical means for detecting an incorrect position of said welding torch including an L-shaped support having a vertical flange fixed to said second block and a horizontal flange, a pair of electrical contacts each having a separate support, current supply means connected to each of said electrical contacts, and signal means for indicating the presence of the contacts in a desired position, the support for one of said contacts including a horizontally elongated slot and said L-shaped member and means mounting said contact for horizontal movement within said slot including a pair of pin members, the support for the other of said contacts including a plate carried by said horizontal rods, a pin member carried by said plate and a vertically elongated slot formed in said other contact.

11. An adjustable mounting for a welding torch, to perform welding on a work piece, comprising in combination,
A. a support structure,
B. means mounted in a fixed position with respect to said support structure for holding a work piece and rotating it about a first axis,
C. means for moving a welding torch along a line generally parallel to said first axis and
D. means mounted on said support structure for holding said welding torch adjacent the peripheral surface of said work piece and including 1. a sleeve member connected to said means for moving the welding torch for adjustment in a plane perpendicular to said first axis and
2. means for rotating said welding torch relative to said sleeve member about a second axis.

12. The combination of claim 11 including means for moving said welding torch in a linear direction within said sleeve member.

13. The combination of claim 12, wherein said means for moving said torch in a linear direction include a tube mounted perpendicularly with respect to the axis of the said sleeve so as to be able to rotate about said second axis, and pinion means mounted on said tube for moving a collar assembly means for holding said welding torch.

14. The combination of claim 13, including electrical contact means for detecting an incorrect position of said torch in a linear direction with respect to said tube, a current source connected to said contacts, and warning signal light means connected to be energized by removal of the contacts from one position to the other, said contacts including a first contact carried by said sleeve and a second contact carried by said tube.

15. An adjustable mounting for a welding torch, to perform welding on a work piece, comprising in combination,
A. a support structure,
B. means mounted in a fixed position with respect to said support structure for holding a work piece and rotating it about a first axis,
C. means mounted on said support structure for holding a welding torch adjacent the peripheral surface of said work piece,
D. means for moving said welding torch along a line generally parallel to said first axis and
E. electrical contact means for indicating an incorrect adjustment position of said welding torch, said electrical contact means including a pair of contacts each of which being carried by a different member moved relative to one another during adjustment of said welding torch and
F. means for supplying current to each of said contacts.

16. The combination of claim 15, wherein said electric contact means includes means for adjusting the position of one of said electrical contacts on its associated member, and means mounting the other of said contacts in a fixed position on its associated member, whereby said movable contact may be set to give an indication in a selected position.

17. The combination of claim 15, wherein one of said electrical contacts includes spring means biasing it into engagement with the other of said electrical contacts.

18. The combination of claim 15, wherein said welding torch is electrically controlled and including means for supplying current to said welding torch, and wherein said electrical contacts are arranged to cut off current to said welding torch when said torch occupies an incorrect adjustment position.

19. The combination of claim 15 including electrical means for rotating said work piece and for moving said support relative to said work piece during operation of said rotating means, and wherein said electrical contact means are positioned to shut off current supply to said rotation and support moving means when said welding torch is in an incorrect position.

* * * * *